United States Patent [19]

Stedronsky

[11] Patent Number: 5,104,729
[45] Date of Patent: Apr. 14, 1992

[54] PROCESS FOR SURFACE MODIFYING A SUPPORT MEMBRANE AND PRODUCT PRODUCED

[75] Inventor: Erwin R. Stedronsky, Richmond Heights, Mo.

[73] Assignee: Monsanto Company, St. Louis, Mo.

[21] Appl. No.: 570,177

[22] Filed: Aug. 20, 1990

[51] Int. Cl.⁵ .............................................. B32B 3/26
[52] U.S. Cl. .................................. 428/304.4; 427/243; 427/245; 428/315.5; 428/315.9; 428/376; 428/515
[58] Field of Search ............................... 427/243, 245; 428/304.4, 315.5, 315.7, 315.9, 376, 515

[56] References Cited

U.S. PATENT DOCUMENTS

| | | | |
|---|---|---|---|
| 3,087,880 | 4/1963 | Kollsman | 204/162 |
| 4,618,533 | 10/1986 | Steuck | 428/315.7 |
| 4,675,213 | 6/1987 | Yamamori et al. | 428/315.7 |
| 4,794,002 | 12/1988 | Henis et al. | 424/488 |
| 4,845,132 | 7/1989 | Masuoka et al. | 521/53 |
| 4,917,793 | 4/1990 | Pitt et al. | 210/94 |

Primary Examiner—William J. Van Balen
Attorney, Agent, or Firm—Charles E. Smith; Paul L. Passley; James C. Bolding

[57] ABSTRACT

Surface modified support membranes and a process therefor are disclosed wherein the support membrane has a substantially uniform layer of hydrogel deposited on essentially the entire surface area thereof.

16 Claims, 1 Drawing Sheet

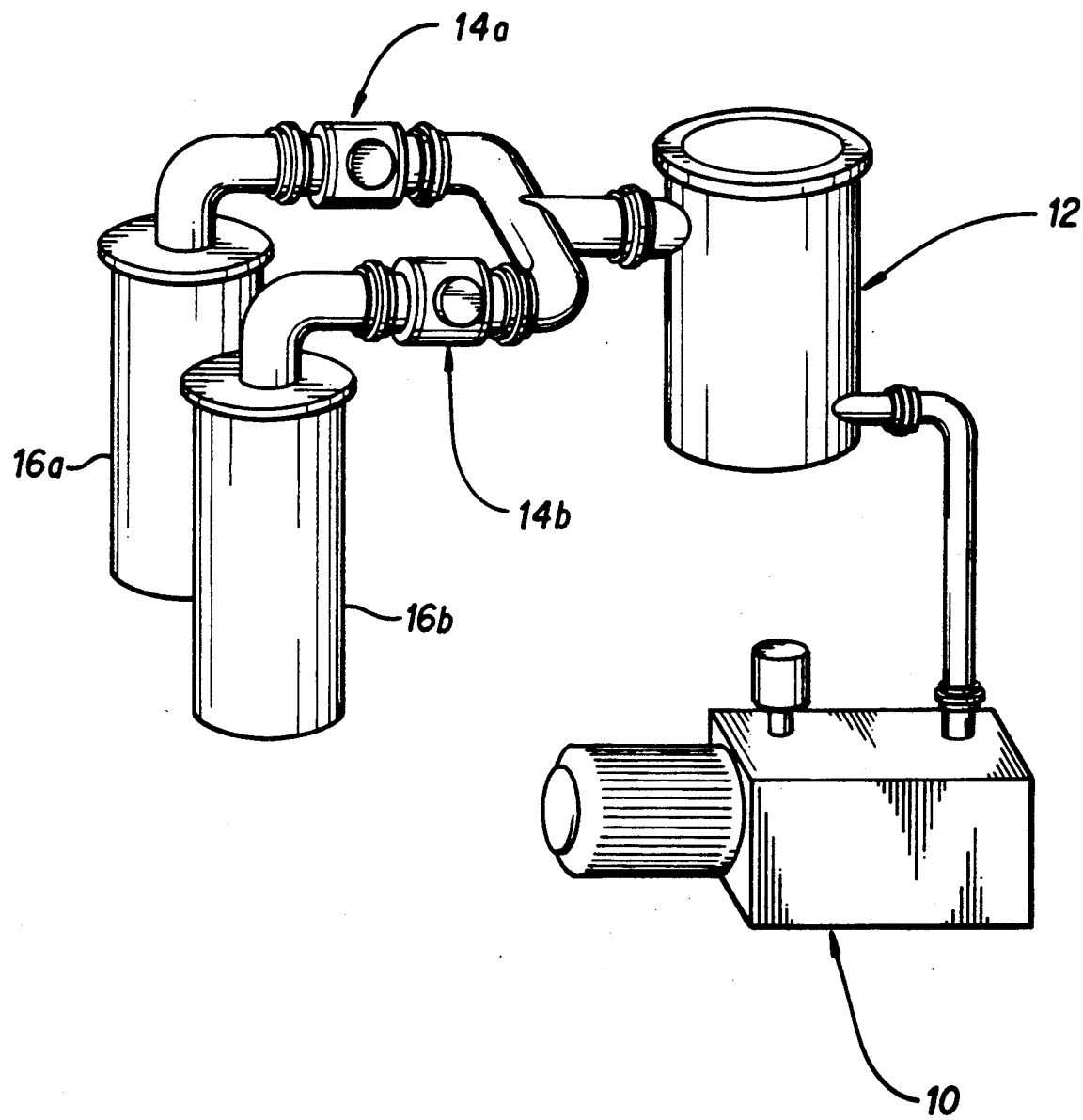

5,104,729

PROCESS FOR SURFACE MODIFYING A SUPPORT MEMBRANE AND PRODUCT PRODUCED

BACKGROUND OF THE INVENTION

1. Field of the Invention

The present invention relates to a process for surface modifying support membranes and to new and improved membranes produced from such process. More particularly, the present invention relates to a process for depositing a uniform layer of a hydrogel onto essentially all of the surface area of a support membrane. In a particularly preferred embodiment, a uniform layer of an ion exchange hydrogel is deposited onto essentially all of the surface area of a porous hollow fiber membrane.

2. Prior Art

Membrane modifying processes disclosed heretofore involve depositing a layer of coating material on the membrane either by solvent evaporation or by irreversibly adsorbing the modifying polymer onto the support membrane. In the solvent evaporation process, a solution of the modifying material is applied to the membrane, excess solvent is removed from the membrane and the membrane is dried to remove the remaining solvent. In some cases a surfactant is added to aid in obtaining a more uniform distribution of modifying material. This results in a modifier on the membrane whose quantity is determined by the amount of solution retained by the membrane and the concentration of the modifier solution. In the solvent evaporation process, the distribution of a modifier on a membrane depends upon migration phenomena occurring during the evaporation process. The coating can be stabilized by cross-linking the modifying material after or during drying. Inherent limitations in these methods are formulating the modifying material to obtain a sufficiently thin, uniform distribution of polymer on the membrane and often having the modifying material concentrated at one surface of the membrane.

The irreversible adsorption process is disclosed in U.S. Pat. No. 4,794,002 and involves soaking the support membrane in a solution of the modifying polymer dissolved in an appropriate solvent for a period of time sufficient for the modifying polymer to adsorb onto the support membrane. The resulting modified membranes are then washed with excess solvent. This particular process is suitable for surface modifying a variety of polymeric support surfaces by irreversibly adsorbing thereon a suitable modifying polymer which possesses the desired chemical characteristics. For example, a fabric made of a polymeric material such as nylon can be surface modified to increase its ability to wet and thereby render clothes made of such a modified fabric more comfortable. Employing this process, one can surface modify and render substantially hydrophilic various laboratory and medical devices which often are made of hydrophobic polymeric materials which interact undesirably with protein material. The surface modifications can be further stabilized by cross-linking or can be derivatized in order to incorporate desired reactive groups, such as, for example, ion exchange groups, e.g., derivatized using chloroacetic acid. Membranes modified by this process have a monomolecular layer of the modifying polymer, as opposed to a pellicular hydrogel, adsorbed onto essentially all of the surface area of the membrane. However, because such membranes contain only a monomolecular layer, adsorption capacity is limited.

U.S. Pat. No. 4,618,533 discloses surface modified membranes having passivation coatings which membranes are prepared by wetting a polymeric porous membrane and coating directly onto the entire surface thereof a monomer grafted and cross-linked in situ onto the membrane. Such membranes are prepared utilizing high concentrations of a free radical initiator and heating the monomer-containing membrane for a short period of time, such as from 2 to 30 minutes, at a temperature between 60° and 95° C. Membranes surface modified under these conditions are often difficult to prepare with reproducible properties because the polymerization reactions are conducted such that only a portion of the initiator is reacted. The reactions are interrupted before completion to avoid completely filling the pores in the membrane with hydrogel which would thereby drastically reduce the liquid permeability of the membrane (see, for example, U.S. Pat. No. 4,917,793). Furthermore, support membranes prepared in this manner, i.e., directly coated by grafting and cross-linking an ionic or functional monomer thereto, have a limited amount of said monomer bound to the membrane. The utility of such membranes is therefor limited when its application depends upon the quantity of said monomer incorporated into the coating material. For example, the ion exchange adsorption of a protein depends upon incorporation of sufficient ionically substituted monomer onto said coating material.

BRIEF DESCRIPTION OF THE INVENTION

The present surface modification process involves introducing a support membrane into, and imbibing such membrane with, a solution of a functionalized vinyl monomer and a cross-linking agent in a solvent system which includes a volatile solvent, optionally a surfactant, and a film-forming nonvolatile solvent. Such membrane can be pretreated with a surfactant to form a coated membrane or, if not pretreated, can be coated with a surfactant by including such surfactant in the solution which contains the funtionalized vinyl monomer. Excess monomer solution is then drained off and the membrane with entrained solution is lyophilized to remove the volatile solvent in order to deposit a uniform layer of monomer and cross-linking agent in a nonvolatile solvent onto essentially all of the surface area of the membrane. The lyophilized monomer-containing membrane is then subjected to free radical polymerization conditions. The resulting new and improved membranes are characterized in that they contain a surfactant layer upon which a uniform layer of hydrogel is deposited.

BRIEF DESCRIPTION OF THE DRAWINGS

The FIGURE is a schematic view of a lyophilizer/oven suitable for use in lyophilizing membranes which contain a solution of monomer and cross-linking agent, for use in heating such membranes to activate polymerization and for use in annealing such membranes.

DETAILED DESCRIPTION OF THE INVENTION

The present invention is directed to surface-modified support membranes having a uniform layer of a hydrogel material deposited onto essentially all of the surface area thereof. As utilized herein, the term "hydrogel"

refers to a cross-linked polymer which swells in the presence of water without dissolving. Also as utilized herein, the term "surfactant" refers to a compound which acts to reduce the interfacial surface tension, and to promote adhesion, between the monomer mixture and/or the hydrogel and the support membrane, including those compounds which coat the support membrane by adsorbing thereonto through hydrophobic interactions. For clarity and brevity in the delineation of the invention, the following description will be primarily directed toward surface modified semipermeable membranes. It should be understood that the parameters described below can be employed to surface modify nonmembrane polymeric surfaces.

Support membranes which can be surface modified according to the teachings of the present invention can be made of essentially any polymeric material capable of being fabricated into a membrane with adequate mechanical strength. Particularly appropriate support membranes for surface modification according to the present invention can be made from a number of polymers, preferably but not limited to hydrophobic polymers such as, for example, polysulfone, polyethersulfone, poly(2,6=dimethyl, 4-phenylene oxide) and derivatives thereof, polyamides, polyimides, polyetherimide, polypropylene, polyethylene, polyvinylidene fluoride, and the like. It should be understood that suitable support polymers may include mixtures and blends of the above polymers as well as other hydrophobic polymers. Particularly preferred polymers for support membranes are polysulfone, polyethersulfone and polypropylene. Preferably, these membranes are porous enough on at least one surface such that the modifying polymer can diffuse through the surface pores to treat the interior of the membrane. Support membranes can be macro-void containing or macro-void free. By "macro-void free" is meant that the membrane is lacking of voids greater than about 20 times the pore size of the immediately contiguous portion of the membrane. Many methods for making porous membranes from hydrophobic polymers are known to those skilled in the art of membrane manufacture. These methods include phase inversion using nonsolvents or temperature and the stretching of micro-crystalline films. Phase inversion using nonsolvents involves dissolving the polymer in a solvent, forming a membrane sheet or tube by extrusion through a die, and contacting the extruded polymer solution with a liquid which is a nonsolvent for the polymer but is miscible with the solvent. The polymer solution gels and, when the solvent is extracted, a porous structure remains. In the case of some polymers which are not soluble in a wide variety of solvents (e.g., polypropylene), a pore-forming material can be identified which forms a single phase solution when mixed with the polymer in the melt, but which is immiscible with the polymer at lower temperatures. A melt containing a mixture of the polymer and the pore-forming agent, is then extruded through a die at a temperature above the phase inversion temperature, the extrudate is cooled to a temperature below the phase inversion temperature, and the solution gels. The pore-forming agent is then removed by evaporation or washing. Yet another method for forming porous membranes, when the polymer is capable of forming microcrystals, involves extrusion of the polymer melt under conditions which induce the micro-crystalline regions to form, then drawing the crystallized film to produce pores between the crystalline regions. These techniques are discussed in more detail in "Synthetic Polymeric Membranes: A Structural Perspective", Second Edition, by Robert E. Kesting, published by Wiley-Interscience (N.Y., 1985).

Preferably, the above-described membranes are pretreated either with a surfactant such as, for example, hydroxypropylcellulose, or with a wetting agent such as, for example, a methanol/water solution. Suitable surfactants are those which are compatible with the support membrane to be modified and with the monomers, cross-linking agents and polymerization initiators described in more detail below. Examples of such surfactants include hydroxypropylcellulose, hydrolyzed polyvinyl acetate, polyvinyl alcohol, ethoxylated octylphenol, and the like. Said surfactant may be optionally chemically derivatized such that it becomes directly reative in the free radical polymerization process, for example, sorbitan trioleate. One skilled in the art of free radical polymerizations can select suitable derivatized surfactants for this process. A preferred surfactant is hydroxypropyl-cellulose having a weight average molecular weight of from about 25,000 to about 500,000. A most preferred surfactant is a 100,000 molecular weight (Mw) hydroxypropylcellulose. Suitable wetting agents are those which are also compatible, examples of which include alcohols, e.g., methanol. Methods for pretreating such membranes are well-known in the art. See, for example, U.S. Pat. No. 4,794,002.

Where the membrane is not pretreated with a surfactant, a surfactant, such as hydroxypropyl-cellulose, can be included in the monomer solution and in the imbibing solution (as described below). In this case, the membrane is pre-wetted utilizing one of the wetting agents described above. The hydroxypropyl-cellulose or other suitable surfactant will then adsorb, preferably via hydrophobic interactions as described in U.S. Pat. No. 4,794,002, onto the membrane to form a coated membrane and then the monomers will be deposited as described below on said coated support membrane. In addition, a surfactant can, optionally, be included in the monomer solution even though the membrane is pretreated with a surfactant. The amount of surfactant utilized will depend on the size, porosity and the like of the support membrane to be modified. Those skilled in the art will recognize that all physical parameters of the resulting membrane are not affected to equal degrees and the desired amount of surfactant will depend on the morphology of the membrane, the monomers utilized to coat the membrane and the ultimate use. It is preferred, however, that the surfactant be included in the imbibing solution. Such surfactant can be present in amounts ranging from about 0.1 to about 1% w/v, preferably from about 0.3 to about 0.7% w/v. A most preferred amount is about 0.5% w/v.

The pretreated support membrane is then introduced into a solution which contains a functionalized vinyl monomer, a cross-linking agent, and a free radical initiator in a suitable solvent system (described below). Where the support membrane is not pretreated, such solution will also include a surfactant as described above. When the support membrane is pretreated, such solution may optinally include additional surfactant as described above. The solution of monomers is then introduced into the porous wall of the fiber through a process referred to as "imbibing". Excess monomer solution is then drained off and the monomer-containing membrane is lyophilized. After lyophilization, polymerization of the monomers is initiated and then the surface modified membrane is recovered.

As utilized herein, the term "imbibing" refers generically to methods utilized to introduce the solutions of wetting agents, surfactants, monomers, and initiators into the pores of the porous support membrane. There are several methods of imbibing. Two of such methods, namely, convective imbibing and diffusive imbibing, are preferred. Convective imbibing depends upon a pressure differential to force a solution into and through the porous wall of the fiber. The pressure differential can be established by vacuum wherein the dry fiber is immersed in the solution and the head space over the solution is evacuated to a pressure which is lower than the vapor pressure of the solvent system. This allows low pressure air trapped in the pores of the fiber to exchange with solvent vapor. When the head space is returned to ambient pressure, liquid solvent replaces the solvent vapor, and carries with it the dissolved materials. Diffusive imbibing involves immersing a membrane, fully wetted with a first solution, in a second solution and permitting substances dissolved in the second solution to diffuse into the pores of the membrane under the influence of an appropriate concentration gradient. Diffusive imbibing preferably involves wetting the dry, unmodified membrane with, for example, methanol or mixtures of methanol-water, and then immersing it in the monomer solution. Where a surfactant is to be utilized in the monomer solution, it is preferable to include an essentially equivalent amount of such surfactant to the imbibing solution as well. Those skilled in the art will recognize that the time period will vary depending on the monomers in solution, the size and structure of the membrane pores and the like. The methanol diffuses out of the porous wall and the monomer solution diffuses into the pores. Different fibers respond to these imbibing methods differently. However, it is within the skill of one skilled in the art of membrane surface modification to identify which method is best for a particular membrane. A preferred method for porous polysulfone membranes is rewetting by vacuum imbibing followed by introduction of monomers into the membrane by diffusive imbibing. The vacuum imbibing procedure should be carried out for a period of time ranging from about 1 to about 30 minutes, preferably from about 2 to about 20 minutes. The diffusive imbibing procedure should be carried out for a period of time from about 0.5 to about 20 hours, preferably from about 1 to about 2 hours.

The term "functionalized vinyl monomer" refers to monomers which are adapted to be imbibed into the pores of the support membrane and which are adapted to be polymerized under free radical polymerization conditions. Such monomers will be functionalized depending on the characteristics one wishes to impart to the fiber. For example, the following Table 1 illustrates various monomers and the corresponding property which would be imparted to the membrane. It should be noted that mixtures of such monomers, as well as mixtures of such monomers with other vinyl monomers (e.g., acrylamide), can also be utilized so long as the characteristics thereof are compatible with the polymerization chemistry. Those skilled in the art of vinyl polymerizations will recognize incompatible combinations of vinyl monomers.

TABLE 1

| MONOMER | FUNCTION |
| --- | --- |
| N-Methacryloylglycylglycine | Weak Cation Exchanger |
| Acrylic Acid | Weak Cation Exchanger |

TABLE 1-continued

| MONOMER | FUNCTION |
| --- | --- |
| Sulfopropyl-Acrylamide (2-Acrylamido-2-Methylpropane Sulfonic Acid) | Strong Cation Exchanger |
| Dimethylaminoproply-Methacrylamide | Weak Anion Exchanger |
| Trimethylammonioproply-Methacrylamide Chloride | Strong Anion Exchanger |
| Diallyldimethylammonium Chloride | Strong Anion Exchanger |
| Vinylimidazole 4-vinyl pyridine | Very Weak Anion Exchanger |
| NHS-Acrylate | Activated Carboxyl |
| N-Acryloyl-N-Methyl-glucamine | Periodate Activatable |
| N-Acryloyl-IDA[1] | Copper Affinity |
| Acryloyl-NH-RGDS[2]-COOH | Cell Attachment |

[1]Iminodiacetic Acid
[2]Arginylglycylaspartylserine = RGDS

A preferred monomer, particularly for surface modifying a porous polysulfone hollow fiber, is 2-acrylamido-2-methylpropane sulfonate (AmPS), available from Lubrizol Corp., Cleveland, Ohio. The resulting surface modified fiber is particularly suitable for cation exchange separation of protein materials.

Cross-linking agents suitable for use in the present invention include those which are generally referred to as difunctional vinyl monomers. Examples of such agents include N,N'-diallyltartardiamide, N,N'-diacryloyl ethylenediamine and methylene-bis-acrylamide. A preferred cross-linking agent is methylene-bisacrylamide.

For ion exchange coated porous membranes, flow uniformity and reproducibility batch-to-batch are extremely important. Liquid permeability of the membranes of the present invention is extremely sensitive to uniformity of the deposited coating. For surface modification of a porous support membrane wherein it is desired to maintain certain flow characteristics, such as uniformity of flow, suitable solvent systems are those which include compatible mixtures of at least one volatile solvent and at least one nonvolatile film-forming solvent. When the volatile solvent is removed, the monomer-containing nonvolatile solvent is deposited on the porous walls of the membrane leaving a void volume within the pores of the membrane equal to the volume of the volatile solvent which had previously occupied such volume. A preferred solvent system is a mixture of water and glycerin.

The quantity of hydrogel, as well as the final porosity of the membrane and the charge density of the hydrogel present on the membrane, can be optimized by adjusting the composition of the monomer solution imbibed into the porous wall of the fiber. Since the monomers are deposited onto the porous support membrane prior to polymerization, the monomers are prepared as a dilute solution. The porous membrane has a defined void volume and a defined internal surface area. The quantity of monomers required to coat a fiber is estimated from this internal surface area. The concentration of the imbibing solution is established from the ratio of the desired quantity of monomers per internal surface areas to the void volume of the membrane. The amount of cross-linking agent utilized will depend on the desired characteristics of the resulting hydrogel. A preferred amount of cross-linking agent for use in the present invention is about 5 weight percent based on the weight of the monomer(s).

Following the imbibing procedure described above, excess monomer solution is removed, such as by draining off, and the support membrane is lyophilized to remove essentially all of the volatile solvent and leave the monomer-containing nonvolatile solvent applied as a uniform film on essentially all of the surface area of the support membrane (as opposed to having the modifying monomers concentrated at one surface of the membrane) while leaving a void volume within such pores.

Following lyophilization, polymerization of the functionalized monomer and cross-linking agent is initiated, preferably utilizing free radical polymerization techniques, such as by utilizing a free radical initiator. Thus, the functionalized vinyl monomer is polymerized and cross-linked in situ in the nonvolatile solvent and in the presence of a surfactant to produce a hydrogel coating on essentially all of the surface area of the membrane. Suitable initiators include those which are adapted to initiate vinyl polymerization in the appropriate solvent systems. For aqueous solvent systems, potassium persulfate and ammonium persulfate are preferred. Optionally, a polymerization accelerator can be utilized. Examples of such accelerators include tetraethylenediamine, sulfur dioxide, and cobalt triethylenetetramine. The amount of accelerator suitable for use in the present invention will range from about 1 to about 4 weight percent based on the amount of the monomers utilized.

The resulting surface modified porous support membranes have a uniform layer of hydrogel deposited on essentially all of the surface area of the surfactant-treated support membrane. Uniformity of the hydrogel layer produces uniform flow characteristics combined with enhanced absorption capacity.

The following general procedure was employed in the following examples, with certain exceptions where noted.

Polysulfone porous hollow fibers were purchased from Permea, St. Louis, Mo., and were received on bobbins and immersed in water. The fibers were utilized as received, without autoclaving.

Fibers are wound into a spiral layer at 8-16 fibers per inch on an aluminum mandrel with a circumference of 22¾". No water trough is required for winding these mats. Permitting the bare, uncoated fiber to dry is acceptable. After the spiral layer is formed, it is taped together with vinyl tape, and the spiral layer is cut and separated into two flat mats, each mat is 11⅜" long.

The mat of fibers is dried in air under ambient conditions without any special precautions. The mats should be mechanically secured in such a manner as to remove the circumferential curl induced during the mandrel winding operation. Mats of dry fibers may be stored for prolonged periods of time without the problems of bacterial contamination associated with storage of wet fibers.

The dry mat of fibers is weighed on a "two-place" balance. The mat of fibers is then rolled parallel to the long axis of the fibers and inserted into a vacuum imbibing tube. This can be any glass or plastic tube capable of being sealed; of withstanding the mechanical forces caused by evacuation; and of being chemically inert to the imbibing solutions. The vessel is filled with 50% MeOH in water [vol/vol], sufficient to totally submerge the fiber mat. The headspace is evacuated. Air trapped within the bores and walls of the fibers bubbles out (mild agitation is often helpful). Evacuation is continued until the liquid is observed to boil. The vacuum is then released abruptly, forcing liquid into the walls and bores. This operation is repeated four times to ensure wetting of all of the internal surfaces of the porous wall of the fiber.

The mat of fibers is removed from the vacuum imbibing tube. Manual shaking is sufficient to remove excess methanol-water from the bores of the fibers. The mat of fibers is then immersed in the diffusion imbibing tube containing the solution of [HPC+monomers], and is agitated by tumbling end-over-end, nutating for two hours at room temperature. The desired final compositions of the monomer solutions are set forth in the examples. The initial compositions need to be adjusted to compensate for the amount of methanol-water entrained within the porous walls of the fibers and carried over into the monomer solution.

After nutation, the mat of fibers is removed from the solution containing HPC and monomers. Excess monomer solution must be drained from the lumen and blotted, conveniently accomplished using paper towels, from the outside of the fibers. The success of imbibing, draining and blotting is determined at this time by weighing the imbibed mat to ascertain that it contains the expected amount of solution. The expected gain of weight is calculated from the known void volume of the fiber, the total length of fibers in the mat, and the density of the imbibing solution.

The wet fiber mat is now supported on a perforated aluminum mandrel designed to fit into the cylindrical vacuum oven. If needed, the mat may be held in place with vinyl tape. A thermocouple is used to monitor temperatures of at least one fiber during the lyophilization and baking operations.

The mat of wet fiber is now quick frozen by immersing in liquid nitrogen. The quick freezing is necessary to ensure that the monomer solution remains physically in place during the freezing operation rather than beginning to evaporate and migrate due to cryopumping onto a freezer element. Excess liquid nitrogen is drained back into its storage container. The freezing operation may be conducted using the open lyophilizer/oven as the container.

Once fully frozen, the fiber mat on the mandrel is transferred to the lyophilizer/oven. A suitable lyophilizer/oven is shown in the FIGURE and includes a vacuum pump 10, a water vapor trap 12, a pair of butterfly valves 14a and 14b, and a pair of lyophilization chambers 16a and 16b each including a heat source (not shown). In order to ensure uniform heat flux to all of the fibers contained in a lyophilization chamber, all of the fibers are arranged a uniform distance from the heat source. For example, the fibers to be lyophilized can be attached to a vented mandrel which is smaller in diameter than that of the lyophilization chambers. The system is evacuated and lyophilization conducted using the liquid nitrogen cooled water trap 12 until a system pressure of 24 microns is achieved with the fibers warmed to 15°-20° C., measured at the thermocouple. These conditions remove the majority of the water from the frozen solution of monomers, without drying the fibers completely and volatilizing glycerol or acrylamide monomers to any significant extent. The temperature of the fibers must be kept below the eutectic temperature of the monomer solution, in the case of the AmPO monomer composition about −14° C., to prevent meltback. The limitation of the eutectic temperature within the fiber is true until the system pressure is below 100 microns, the temperature within the fiber is permitted to climb ballistically to +15° C. as rapidly as possible.

When lyophilization is complete, the lyophilizer/oven is isolated from the liquid nitrogen cooled water trap and the vacuum pump. The lyophilizer/oven is then back-filled with dry nitrogen gas to one-half atmosphere total pressure. For certain persulfate initiated polyerizations, a small amount of sulfur dioxide gas is bled in with the nitrogen. The $SO_2$ gas dissolves in the mixture of monomers remaining on the fibers, with some of the $SO_2$ being trapped by acid-base reaction with the bicarbonate present in the mixture. This forms sulfite anions which act as the accelerator in the free radical initiator system used for acrylamide hydrogels.

The lyophilizer/oven is then heated to 50° C. for 30 minutes, to allow the polymerization to occur. Following this, the oven is heated to 90° C. for 30 minutes, to ensure that any residual accelerator or initiator is reacted. The oven is then heated to 120° C. for one hour, to anneal the fibers. Commercially available lyophilizers are generally not available with capability to heat beyond 40° C., therefore customized lyophilizers/ovens are required and one can be constructed by those skilled in the art to heat to 120° C.

The oven is cooled, vented to atmosphere, and the mat of fibers removed. The mat is now ready for further manufacturing processes which are common to all coating chemistries. The fiber mat is cut and heat-sealed on a trim-sealer into suitable lengths. These lengths can then be inserted into a prepared cartridge shell and the fibers sealed into the cartridge with hot-melt glue, excess fiber length and hot-melt is trimmed off, and the assembled cartridge is now ready.

EXAMPLE 1

Three sets of hydrogel-coated support membranes, each set including at least three of the membranes, and each set having a different concentration of monomers, were prepared according to the generalized procedure set forth above and utilized to adsorb cytochrome C and IgG to determine capacity of the fibers for each protein. Results are shown in Table 2.

set of at least three membranes. Results are reported in Table 3.

TABLE 3

| Run | | $L_p$ $\times 10^9$ cc/ dyne-sec | IgG Cap. μg/Cm. fiber |
|---|---|---|---|
| D | Bare fiber | 437 ± 12 | — |
| E | AmPS coating; no surfactant | 415 ± 59 | 46 ± 8 |
| F | AmPS coating; HPC in monomer solution | 342 ± 14 | 92 ± 9 |
| G | AmPS coating; HPC precoated on fiber | 132 ± 18 | 102 ± 23 |

EXAMPLE 3

This example illustrates the effectiveness of fibers of the present invention, in terms of protein capacity, as compared to those prepared by utilizing evaporative drying as opposed to lyophilization. Using the imbibing solution of Run A of Example I, two fibers were prepared utilizing the generalized procedure set forth above, except that for one of the fibers the solvent was evaporated by heating as opposed to lyophilizing. The protein capacity of each, as well as the uniformity of flow, was determined by adsorbing proteins onto the coated fibers and slicing the fibers into four equal sections. Results are reported in Table 4.

TABLE 4

| | Cyt.C (μg/cm) | Bov.IgG (mg/cm) | Resistance to flow[1] |
|---|---|---|---|
| Lyophilized Section | | | |
| A | 483 | 189 | 70 |
| B | 425 | 152 | 69 |
| C | 467 | 169 | 64 |
| D | 461 | 165 | 85 |
| Evaporatively dried Section | | | |
| A | 384 | 172 | 500 |
| B | 346 | 143 | 122 |
| C | 277 | 107 | 115 |
| D | | 63 | 500 |

[1] Second per 5 ml at 20 psig.

TABLE 2

| | Composition of Monomer Solution (mMoles/liter) | | | | | | HPC[4] | | IgG | Cyto- |
|---|---|---|---|---|---|---|---|---|---|---|
| Run | AmPS[1] | Am[2] | BAm[3] | Glycerin | $K_2S_2O_8$ | NaHCO$_3$ | (% w/v) | $L_p$[5] | μg/cm-fiber | chrome C μg/cm-fiber |
| A | 7.14 | 11.6 | 4.2 | 571 | 0.40 | 0.40 | 0.5 | 58 ± 7 | 150 ± 7 | 420 ± 23 |
| B | 44.7 | 78.7 | 6.7 | 571 | 0.40 | 0.40 | 0.5 | 55 ± 3 | 260 ± 14 | 241 ± 54 |
| C | 34.7 | 108.7 | 7.2 | 571 | 0.40 | 0.40 | 0.5 | 109 ± 4 | 225 ± 25 | 225 ± 13 |

[1] 2,2-acrylamide-2-methylpropane sulfonate
[2] acrylamide
[3] methylene-bis-acrylamide
[4] hydroxypropyl cellulose (MW 100,000, DS≈3)
[5] $\times 10^9$ cm$^3$/dyne-sec

EXAMPLE 2

This example illustrates the effect of having a surfactant present on the fiber, e.g., HPC, on the deposition of hydrogels onto polysulfone porous hollow fibers. A bare fiber was compared, in terms of protein capacity, with polyacrylamide coated fibers with and without HPC, and also with an HPC-pretreated fiber. Measurements were made on at least three fibers of each set. The coated fibers were prepared according to the generalized procedure set forth above (the concentration of the imbibing solution being the same as Run B of Example 1) except that for the pretreated fiber, HPC was not included in the imbibing solution. Each run includes a This Example 3 illustrates several points. Most importantly, the fibers prepared according to the present invention have a uniform layer of the hydrogel deposited thereon whereas those which are evaporatively dried have a nonuniform layer. This can be seen by comparing the resistance to flow of the sections of the lyophilized fiber versus that of the fiber prepared utilizing the evaporation method. Note that the resistance to flow for the fiber prepared utilizing the lyophilization step is uniform throughout the fiber whereas the other fiber has a nonuniform coating resulting in nonuniform flow characteristics. Note also that the binding capacity of each segment of the lyophilized fiber is also uniform and has a much greater capacity than that of the evaporatively dried fiber. In addition, it should be noted that the resistance to flow of the evaporatively dried fiber is extremely high, i.e., has relatively low flow, as compared to the lyophilized fiber.

EXAMPLE 4

This example demonstrates that surfactants other than HPC are suitable for use in the present invention. Two sets of at least three fibers were surface modified according to the general procedure set forth above, except that in one case HPC was utilized and in the other sorbitan trioleate was utilized. For the HPC-containing fibers, the $L_p(\times 10^9 \text{ cc/dyne-cm})$ was $64 \pm 11$ and the $\mu g/cm$-fiber of Cytochrome C was $151 \pm 13$. For the sorbitan trioleate-containing fiber, $L_p$ was $56 \pm 10$ and $\mu g$ Cytochrome C/cm. fiber was $189 \pm 20$.

EXAMPLE 5

This example illustrates the surface modified membranes of the present invention utilizing different vinyl monomers. In this example, the general procedure described above was utilized except that acrylic acid (AA), quaternized methacrylamide and dimethylaminopropyl methacrylamide were utilized as the monomers. The resulting membranes were tested for liquid permeability and protein capacity. Again, at least three membranes were made for each set. Results are reported in Table 5.

TABLE 5

| Run | Ionic Moiety | $L_p^1$ Mean | $\pm \sigma$ | Capacity $\mu g$/cm-fiber Protein | Mean | $\pm \sigma$ |
|---|---|---|---|---|---|---|
| A | AA | 111 | ±14 | IgG | 64 | ±19 |
| B | AA | 111 | ±13 | IgG | 58 | ±10 |
| C | DMA | 75 | ±17 | BSA | 213 | ±14 |
| D | QUA | 77 | ±20 | BSA | 207 | ±35 |
| E | QUA | 69 | ±15 | BSA | 198 | ±24 |

[1] $L_p \cdot 10^9$ cc/dyne-sec

What is claimed is:

1. A surface modified support membrane comprising a support membrane having a substantially uniform layer of a hydrogel deposited on essentially all of the surface area thereof said hydrogel being formed from a functionalized vinyl monomer polymerized and cross-linked in situ on said support membrane and in the presence of a surfactant.

2. The membrane of claim 1 wherein the support membrane comprises a polymer selected from the group consisting of polysulfone, polyether sulfone, polyetherimide, polypropylene, polyethylene and polyvinylidene fluoride.

3. The membrane of claim 2 wherein said support membrane is porous.

4. The membrane of claim 1 wherein said functionalized vinyl monomer is selected from the group consisting of carboxymethyl acrylamide, sulfopropyl acrylamide, dimethylaminopropyl methacrylamide, trimethylammoniopropyl methyacrylamide, vinylimidazole, vinylpyridine, diallyldimethylammonium chloride, NHS-acrylate, N-acryloyl-N-methylglucamine, N-acryloyl-IOA, methacryloxy phosphoryl choline, acryloyl-NH-RGOS-COOH, and N-acryloyl-L-histidine.

5. The membrane of claim 1 wherein said hydrogel is cross-linked through a difunctional vinyl monomer.

6. The membrane of claim 5 wherein said difunctional vinyl monomer is selected from the group consisting of methylene-bis-acrylamide, N,N'-diacryloyl ethylene diamine and N,N'-diallyltartardiamide.

7. The membrane of claim 1 wherein said surfactant is selected from the group consisting of ethoxylated octylphenol sorbitan trioleate hydroxypropyl cellulose, hydrolyzed polyvinyl acetate, and polyvinyl alcohol.

8. The membrane of claim 1 wherein said support membrane is a porous polysulfone hollow fiber, and said hydrogel consists of polymerized 2-acrylamido-2-methylpropane sulfonate cross-linked through methylenebis-acrylamide.

9. A surface modified support membrane comprising a hydrophobic support membrane having a first material adsorbed via hydrophobic interactions onto the surface area thereof to form a coated support membrane and a second polymeric material, formed from a functionalized vinyl monomer polymerized and cross-linked in situ on said coated support membrane.

10. The membrane of claim 9 wherein said support membrane comprises a polymer selected from the group consisting of polysulfone, polyether sulfone, polyetherimide, polypropylene, polyethylene and polyvinylidene fluoride.

11. The membrane of claim 9 wherein said first polymeric material is selected from the group consisting of hydroxypropylcellulose, hydrolyzed polyvinyl acetate and polyvinyl alcohol.

12. The membrane of claim 9 wherein said functionalized vinyl monomer is selected from the group consisting of carboxymethyl acrylamide, sulfopropyl acrylamide, dimethylaminopropyl methacrylamide, trimethylammoniopropyl methyacrylamide, vinylimidazole, NHS-acrylate, N-acryloyl-N-methylglucamine, N-aryloyl-IDA, methacryloxy phosphoryl choline, acryloyl-NH-RGDS-COOH, and N-acryloyl-L-histidine.

13. The membrane of claim 9 wherein said second polymeric material is cross-linked through a difunctional vinyl monomer.

14. The membrane of claim 13 wherein said difunctional vinyl monomer is selected from the group consisting of methylene-bis-acrylamide and N,N-diallyltartardiamide.

15. The membrane of claim 9 wherein said support membrane is a porous polysulfone hollow fiber, said first polymeric material is hydroxypropylcellulose and said second polymeric material is polymerized and cross-linked 2,2-acrylamido-2-methylpropane sulfonate.

16. A process for surface modifying a support membrane comprising the steps of:
   a) introducing, in the presence of a surfactant, a support membrane into a solution, said solution comprising a functionalized vinyl monomer and a cross-linking agent in a suitable solvent system, said solvent system including a volatile solvent and a nonvolatile film-forming solvent;
   b) imbibing said support membrane with said solution;
   c) removing excess solution from said support membrane;
   d) lyophilizing said membrane to remove the volatile solvent;
   e) subjecting said membrane to free radical polymerization conditions; and
   f) recovering said support membrane.

* * * * *